Aug. 21, 1945.    J. W. ORENDORFF    2,383,413
PLANTER
Filed June 12, 1944
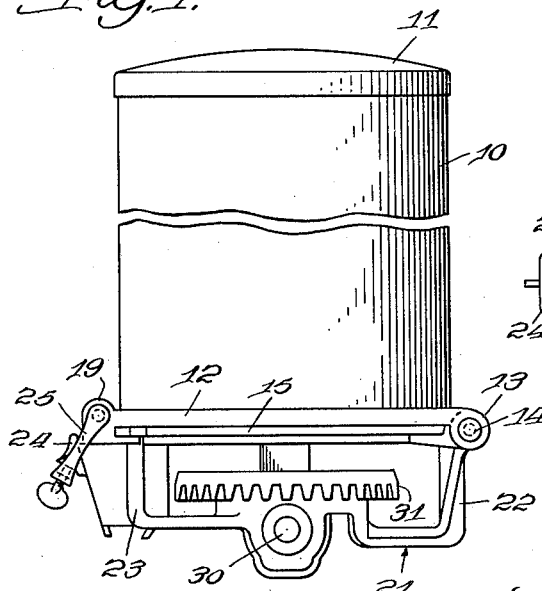
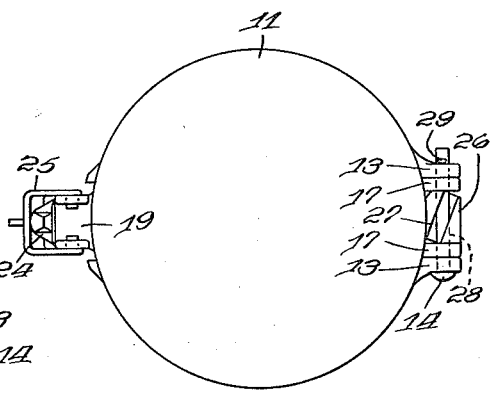
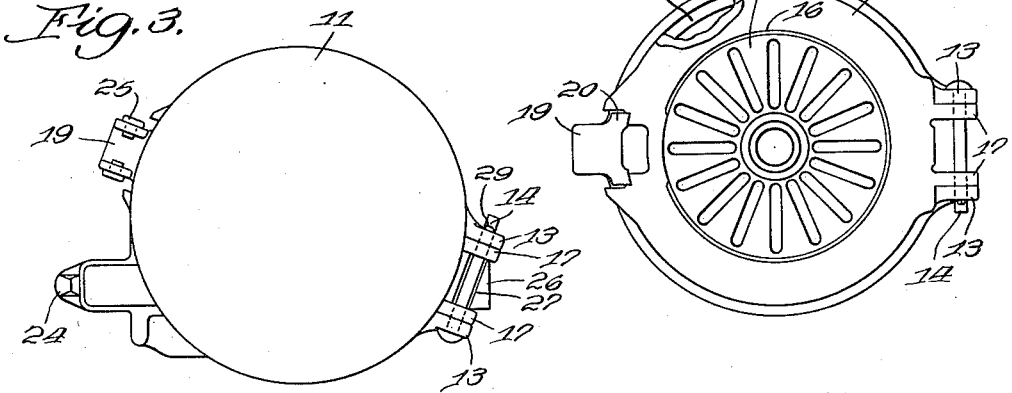
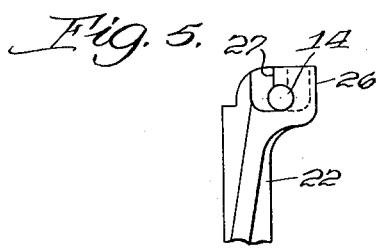
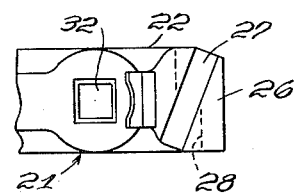
Inventor:
John W. Orendorff.
By Paul O Pippel
Atty.

Patented Aug. 21, 1945

2,383,413

UNITED STATES PATENT OFFICE 2,383,413

PLANTER

John W. Orendorff, Canton, Ill., assignor to International Harvester Company, a corporation of New Jersey Application June 12, 1944, Serial No. 539,976

4 Claims. (Cl. 111—1)

This invention relates to agricultural dispensing devices and particularly to planters. More specifically, the invention concerns a removable planter hopper, and has for its principal object the provision of means for the hinged connection of a hopper and its associated plate mechanism to its support in such a way as to permit separation of the hopper for the purpose of cleaning, repairing or the like without danger of spilling its contents.

Another object is to provide for a planter hopper a hinged connection with its support which permits tilting thereof about its connection, or removal thereof bodily.

Still another object is to provide for a dispenser, including a hopper, a base plate and a support hingedly connected by a common pivot pin, means for dissociating the hopper and plate from the support quickly without removing the pivot pin.

These and other objects will become clear from the following detailed description when read in conjunction with the accompanying drawing, wherein:

Fig. 1 is a view in side elevation of a dispenser mechanism with certain parts removed for clarity embodying the features of the present invention;

Fig. 2 is a plan view of the structure shown in Fig. 1, with the hopper in locked position;

Fig. 3 is a plan view similar to Fig. 2, but showing the hopper angularly displaced from its support for removal therefrom;

Fig. 4 is a view from below of the hopper structure with the base plate hingedly connected thereto and showing the seed plate retained thereby;

Fig. 5 is a detail of one of the supporting standards showing the placement of the pivot pin; and Fig. 6 is a plan view of a portion of the supporting standard illustrating the pivot pin holder and the communicating entrance thereto.

Referring to the drawing, numeral 10 designates a hopper having a cover 11, and an annular base 12 having a pair of lugs 13 projecting therefrom apertured to receive a pivot pin or pintle 14. Likewise pivoted upon pin 14 is a base plate 15, having a central opening 16 and spaced lugs 17, apertured for the reception of the pin 14. Plate 15 serves for the support of a seed plate 18 held between the plate 15 and a flange 18a on base 12.

The base 12 of hopper 10 is provided at the side opposite lugs 13 with a projecting member 19, provided on its under surface with an inwardly projecting ledge portion 20, upon which the plate 15 rests to prevent pivoting thereof, consequent displacement of the seed plate 18, and spilling of seed when the hopper is removed for inspection purposes.

Hopper 10 rests upon a support generally indicated at 21 and having vertically extending standards 22 and 23. Standard 23 is provided with a latch member 24 adapted to cooperate with a locking member 25 pivoted upon the projection 19 on hopper base 12, thus fastening the hopper to its support in a manner well known in the art.

Standard 22 opposite standard 23 is provided at its upper end with a centrally bored bearing or pivot pin holder 26 adapted to receive the journal portion of pin 14 between the lugs 17 on plate 15.

In hopper mechanisms of this type, it is customary when it is desired to remove the dispenser assembly comprising the hopper 10, the base plate 12, the seed plate 18 from its support, to withdraw the pin 14 in order to dislodge the base plate 15 from locking position with the ledge 20 upon which it rests. Such a procedure, of course, generally involves a disarrangement of the associated plates and spilling of the contents of the hopper. In order to avoid this difficulty, applicant has provided means for removing the hopper and plate assembly from its pivotal connection with the support without removing the pin 14, until the hopper has been upended in a position for inspection.

This is accomplished by the provision in the pin holder 26 of an opening 27 extending diagonally to the axis of the bore 28 and communicating therewith. Pin 14 is held in place by a cotter 29.

When the operator wishes to inspect the interior of the hopper, or its associated plates, the locking member 25 is released and the hopper 10 angularly displaced to the position shown in Fig. 3, whereupon the pivot pin 14 falls into alinement with the diagonal opening 27. The hopper and plate assembly may then be bodily removed and transported without danger of displacement of the base plate or seed plate, and without danger of spilling the contents of the hopper. The hopper may then be inverted, pin 14 removed, and seed plate 18 and base plate 15 dissociated from the hopper 10. Reassembly of the parts may be very quickly made by simply reinserting pin 14 in the lugs 13 and 17. The hopper and plate assembly is then placed upon the support 21 with the pin 14 in position to be inserted in the opening 27. A twist of the hopper 10 then seats the pin 14 in its bore 28 where it is held against displacement by the overlapping portions of the pivot holder 26.

The means for driving the seed plate of the dispenser mechanism forms no part of the present invention. It is sufficient to say that a drive shaft 30 provides power for imparting rotary movement to a gear 31 which in turn transmits rotary motion in any suitable manner to the seed plate 18. Support 21 is provided with a bolt opening 32 by which it may be attached to a suitable implement framework not shown.

It should now be understood that a simple and efficient mechanism has been provided for hingedly connecting a dispenser to a support, by which the dispenser may be readily removed from the support without danger of displacing the driven parts or spilling the contents of the dispenser hopper.

Having described the invention, it should be understood that modifications may be made therein without departing from the spirit of the invention or the scope of the appended claims.

What is claimed is:

1. In a planter, a support, a pivot pin mounted in the support, a hopper pivoted on the pin to form a hinge joint with the support, a base plate pivoted on the pin, means for removing the hopper, the base plate and the pivot pin as a unit from the support, including a centrally bored pivot holder on said support for the reception of said pin, said pivot holder having a radial opening therein coextensive with the length and diagonal to the pivot axis thereof, and serving for the radial insertion of said pivot pin in said bore.

2. In a planter, a hopper, a base plate, a pivot pin hingedly connecting the hopper and the base plate, a support, and a bearing on the support having an internal bore for receiving the pin to form a hinge joint with the hopper and the plate, the bearing having a radial opening therein coextensive with the length thereof, diagonal to the pivot axis thereof and communicating with said bore for the insertion of the pin in the bore without severing the pivotal relation between the plate and the hopper.

3. In a planter, a pivot pin, a hopper and a plate each having spaced lugs apertured for coaxial pivotal mounting adjacent the ends of the pin, a support, a pin holder on the support having a central bore substantially equal to the spacing between the innermost of said lugs for the reception of the pin to form a hinge joint therewith, said holder having a diagonal radial opening substantially coextensive with the length thereof and communicating with the bore, whereby the portion of said pin between the innermost of said lugs may be inserted in said bore without severing the connection between said plate and said hopper.

4. In a planter, a dispenser, a support for the dispenser, means for hingedly connecting the dispenser to the support, and fastening means for locking the dispenser to the support, said connecting means including a transverse pivot pin carried by the dispenser, a pin holder on the support having a central bore to receive the pin, and an opening in the holder diagonal to the axis of said bore and communicating therewith, said pin being adapted to be retained against displacement from said holder when said fastening means is in locking position, and to be aligned with said opening for removal thereof upon angular displacement of said dispenser with respect to said support.

JOHN W. ORENDORFF.